Figure 1:
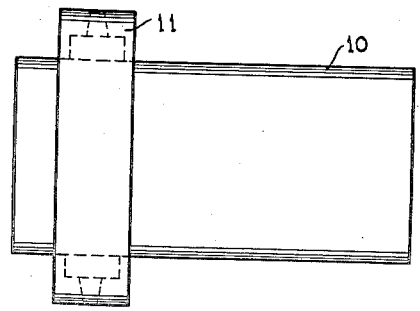

Sept. 29, 1936.   R. K. HOPKINS   2,055,535
METHOD FOR CORRUGATING CONDUITS
Filed June 20, 1934

INVENTOR
Robert K. Hopkins
BY
Virgil F. Davis
ATTORNEY

Patented Sept. 29, 1936

2,055,535

UNITED STATES PATENT OFFICE 2,055,535

METHOD FOR CORRUGATING CONDUITS

Robert K. Hopkins, New York, N. Y., assignor to M. W. Kellogg Company, New York, N. Y., a corporation of Delaware Application June 20, 1934, Serial No. 731,399

3 Claims. (Cl. 153—73)

This invention relates to the corrugating of conduits and in particular to a method for corrugating heavy walled conduits of the character used for conducting liquids, vapors and gases under high pressure conditions with or without accompanying high temperature conditions.

Conduits of the character mentioned, whether used as straight lengths or as bends, are corrugated in order to increase their flexibility. The flexibility of corrugated conduits is determined primarily by three factors, the center to center distances between corrugations, the height of the corrugations, and the contour of the corrugation. Therefore, the optimum corrugated conduit should have very high corrugations with the sides of each corrugation practically parallel to each other and perpendicular to the axis of the conduit and the distance between centers of the corrugations should be a minimum.

It is the present practice in corrugating conduits to heat a band around the conduit at the region of the first desired corrugation, discontinuing the heating when the band has been heated to the proper temperature, and pushing up the corrugation by forcing the ends of the conduit towards each other and repeating this procedure for each of the other desired corrugations. With this method it is not possible to produce the optimum corrugated conduit above mentioned.

In the first place the center to center distance between corrugations cannot be made to even approach the desired minimum because of the physical size of the furnace used for heating the bands around the conduit and also because of the diffusion of heat that takes place in the conduit during the heating of the bands. If it is attempted to heat a band around the conduit closer to an already formed corrugation than the limit naturally imposed by the method of the prior art the already formed corrugation will be sufficiently heated to be deformed when the new corrugation is pushed up.

Corrugations of maximum height furthermore, cannot be attained by the method of the prior art as there is also a natural limit as to the width of the band that can be heated from which acceptable corrugations can be produced. It is of course possible to heat a band of any width, but if the band is made too wide the resulting corrugation will not be uniform and may be wrinkled or go in rather than out in spots.

Although it is entirely possible, with the prior method of the art, to form single corrugations with parallel sides it is not possible to maintain the sides of such corrugations parallel when subsequent corrugations are pushed up. The reason for this is that a very considerable force is required to start a corrugation by pushing, which force is many times that required to push the corrugation to its finished dimensions after it is started. Thus if a corrugation is pushed to a point where its sides are parallel, or nearly parallel, the very considerable force required to start the subsequent corrugation will cause the parallel sides of the first corrugation to collapse. Nothing of practical value has so far been proposed for preventing the collapsing of the parallel walls.

I have devised a simple, practical method for producing the optimum corrugated conduits above mentioned. In accordance with my invention I initially corrugate the conduit in accordance with the method of the prior art to produce a corrugated conduit that has all of the natural limitations imposed by the method of the prior art. After the thus corrugated conduit has been cooled I place the heating furnace around the first of the corrugations and reheat the metal thereof to the proper corrugating temperature. Because of the fact that the furnace is now surrounding a corrugation rather than a straight band of the conduit practically only the metal of the corrugation is raised to the corrugating temperature and very little heat diffuses to the straight band between the corrugations.

When the corrugating temperature is reached the furnace is removed and the ends of the conduit pushed towards each other until the sides of the corrugation are substantially parallel. The corrugation is then cooled and the just described cycle repeated at each of the remaining corrugations. It is to be particularly noted that since the force required to bring the sides of the corrugations to parallelism, or substantial parallelism, is only a small percentage of the force required to start a corrugation, the corrugations after their sides have been brought to parallelism are substantially unaffected by the further steps of the method. By my method though the length of the straight band between corrugations remains substantially unchanged, the distance between centers of corrugations is materially reduced since the bottom walls of the corrugations are brought much closer together. Although the amount of the conduit in the corrugations remains substantially unchanged the corrugations are much higher for instead of being disposed at oblique angles to the axis of the conduit they are vertically disposed relative to the axis of the conduit.

Figure 4:
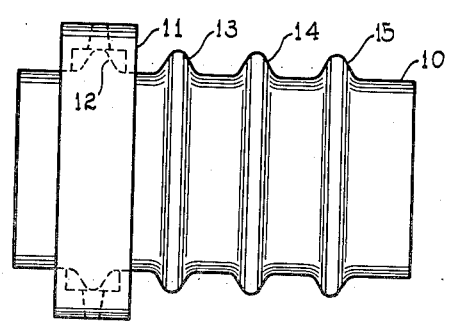
Figure 2:
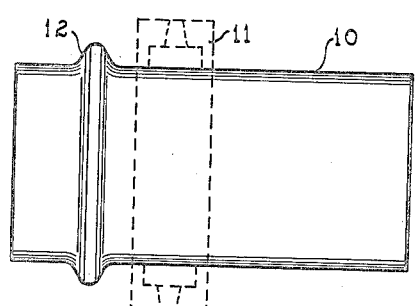
Figure 5:
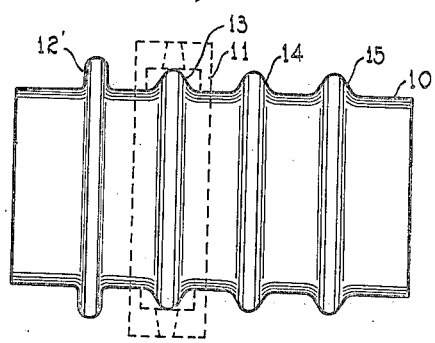
Figure 3:
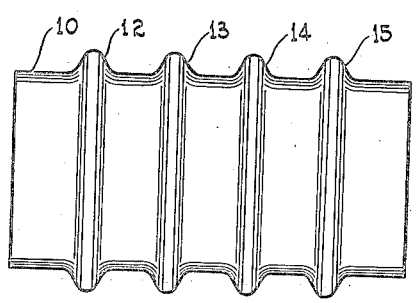
Figure 6:
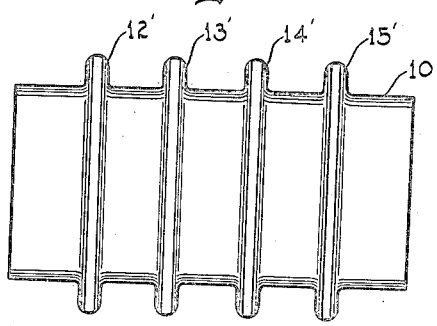
Figure 7:
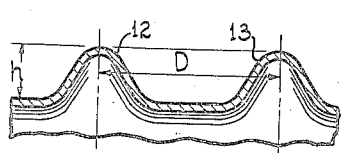
Figure 8:
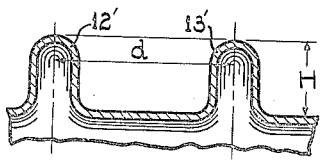

My invention will be better understood and its objects and advantages better appreciated from a consideration of the following description thereof taken with the accompanying drawing in which, Fig. 1 is a plan view of a conduit with a furnace positioned thereon for heating the first band, Fig. 2 is a view similar to Fig. 1 but showing the first corrugation pushed up and the furnace positioned for heating the second band, Fig. 3 is a view similar to Fig. 1 showing the conduit fully corrugated, Fig. 4 shows the corrugated conduit of Fig. 3 with the heating furnace positioned on the first corrugation for the reheating operation, Fig. 5 shows the corrugated conduit of Fig. 3 after the first corrugation has had its sides made parallel and with the furnace positioned for reheating the second corrugation, Fig. 6 shows the corrugated conduit of Fig. 3 after all of the corrugations have had their sides made parallel, Fig. 7 is an enlarged fragmentary sectional view of the corrugated conduit of Fig. 3, and Fig. 8 is an enlarged fragmentary sectional view of the corrugated conduit of Fig. 6.

Conduit 10 may be made of any of the materials used in making corrugated conduits for the power, oil refining and chemical industries and may be of any diameter and thickness which it has been found practical to corrugate. Furnace 11 may be of any desired construction but should be of such physical size that it will heat a band of metal around conduit 10 of such a width that an acceptable corrugation may be produced therefrom. The maximum practical width of the band depends on the character of the metal of conduit 10, the thickness thereof and the diameter of conduit 10. The maximum practical width is generally arrived at by experiment and is not exceeded for otherwise the corrugations may not be uniform, they may be wrinkled, and also portions of them may push in instead of out.

Furnace 11 is placed on conduit 10 as shown in Fig. 1 so as to encircle the band of conduit 10 that is to form the first corrugation. When the band is heated to the proper temperature furnace 11 is removed and the ends of conduit 10 pushed together with sufficient force to start corrugation 12. After corrugation 12 is started the application of force is continued until corrugation 12 approaches the shape best shown in Fig. 7. The force necessary for pushing up corrugation 12, once it has been started, is only a very small percentage of the force required to start the corrugation. Corrugation 12 is then allowed to cool in the air or is cooled rapidly by applying suitable cooling medium, such as water, etc., thereto. Furnace 11 is then again placed on conduit 10 but so as to encircle the band of conduit 10 that is to form the second corrugation.

Since the location of the second band, and the subsequent bands, to be heated determines the distance between centers of the corrugations, one of the factors affecting the flexibility of corrugated conduits, furnace 11 is placed as close to corrugation 12 as its physical size and the diffusion of heat in walls of conduit 10 will allow. The actual distance is determined by experiment and should not be exceeded for otherwise corrugation 12 may be so softened by the diffused heat that it will be deformed when corrugation 13 is pushed up. Corrugation 13 is pushed up in the same manner as corrugation 12 and after it has cooled the just described procedure is repeated at the site of each of the other desired corrugations, two more, 14 and 15 being shown, until the conduit 10 appears as shown in Fig. 3.

As shown in Fig. 7 conduit 10 will have its corrugations spaced apart by a distance D, each of the corrugations will have a height $h$ and the walls of each of the corrugations will be disposed at oblique angles relative to the axis of conduit 10.

Furnace 11 is then again placed on conduit 10 to encircle corrugation 12, as is shown in Fig. 4 and the heating allowed to go on until the metal of corrugation 12 is in condition for further pushing. Furnace 11 is then removed and the ends of conduit 10 pushed towards each other until the sides of corrugation 12 are brought to parallelism and corrugation 12' is produced. It is to be noted that when corrugation 12 is reheated, by reason of the fact that more metal is concentrated within furnace 11 than before, the heat does not diffuse as far along the walls of conduit 10 as when the band of corrugation 12 was originally heated. The heat diffusion is also less than before as the metal is not heated to as high a temperature.

After corrugation 12' has been cooled furnace 11 is moved to the position of Fig. 5 and corrugation 13 is reheated and pushed up to produce corrugation 13' as just described in connection with corrugation 12'. This procedure is then repeated at corrugations 14 and 15 to produce corrugations 14' and 15'. It is to be particularly noted that the pushing force necessary to transform corrugations 12, 13, 14 and 15 into corrugations 12', 13', 14', and 15', respectively, does not exceed the force required to finish corrugations 12, 13, 14 and 15. Therefore the force exerted during the formation of corrugations 12', 13', 14' and 15' is insufficient to collapse the parallel walls of corrugations 12', 13', 14' and 15' or to materially move them after they are brought to parallelism and cooled.

As shown in Fig. 8 conduit 10 when completely corrugated in accordance with my novel method will have its corrugations spaced apart by a distance $d$, each of the corrugations will have a height H, and the walls of each of the corrugations will be parallel to each other and at right angles to the axis of conduit 10.

The flexibility of the corrugated conduit produced in accordance with my invention will be greater than the flexibility of similar corrugated conduits of the prior art by the ratio of $$\frac{D}{d}$$

and also by the ratio of $$\frac{H}{h}$$

and further by a factor which is a function of the contour of the corrugations of the prior art and the contour of the parallel sided corrugations.

I claim:

1. The method of corrugating conduits to produce therein corrugations that are spaced apart by center to center distances appreciably smaller than the minimum center distances attainable by reason of natural limitations due to conduit diameter and thickness and heat diffusion in the conduit walls; which comprises, corrugating a conduit by heating a band of the conduit at the locus of each corrugation and upsetting the heated metal by the application of pressure to produce therein acceptable corrugations spaced apart by the minimum center to center distances attainable by reason of the natural limitations due to the diameter and thickness of the conduit and the diffusion of heat in the conduit walls; reheating the first of said corrugations to a corrugating temperature; applying a force to move the ends of said conduit towards each other to appreciably reduce the distance between the bottom of the walls of said first corrugation; cooling said first corrugation; and repeating said heating, force applying and cooling steps at each of the other corrugations of said conduit whereby the center to center distance between said corrugations are appreciably below said minimum.

2. The method of corrugating conduits which comprises heating a band around the conduit at the site of the first desired corrugation to bring the metal to the corrugating temperature; applying a force that tends to bring the ends of the conduit towards each other of sufficient magnitude to start a first corrugation at said heated band; reducing the magnitude of said force as required to finish the first corrugation; cooling the thus formed corrugation; heating a second band around the conduit to bring the metal thereof to the corrugating temperature; said second band being located at such a distance from said corrugation that said corrugation is not materially softened by said heating; applying a force that tends to bring the ends of the conduit towards each other of sufficient magnitude to start a second corrugation at said second heated band; reducing the magnitude of said force as required to finish said second corrugation; cooling said second corrugation; repeating said heating, force applying and cooling steps at the site of each of the other desired corrugations; reheating said first corrugation to bring the metal thereof to a corrugating temperature; applying a force that tends to bring the ends of the conduit towards each other substantially equal to said force of reduced magnitude to materially reduce the distance between the bottom ends of the walls of said first corrugation; cooling said first corrugation; and repeating the last mentioned reheating, force applying and cooling steps at each of the other corrugations of said conduit whereby the distance between centers of the corrugations are materially reduced and the heights thereof are materially increased.

3. The method of corrugating conduits which comprises heating a band around the conduit at the site of the first desired corrugation to bring the metal to the corrugating temperature; applying a force that tends to bring the ends of the conduit towards each other of sufficient magnitude to start a first corrugation at said heated band; reducing the magnitude of said force as required to finish the first corrugation; cooling the thus formed corrugation; repeating said heating, force applying and cooling steps at the sites of the remainder of the desired corrugations; reheating said first corrugation to bring the metal thereof to a corrugating temperature; applying a force that tends to bring the ends of the conduit towards each other substantially equal to said force of reduced magnitude until the walls of said first corrugation are substantially parallel and vertically disposed to the axis of the conduit; cooling said first corrugation; and repeating the last mentioned reheating, force applying and cooling steps at each of the other corrugations whereby the sides of each of the corrugations are made parallel and the heights of the corrugations are increased.

ROBERT K. HOPKINS.